Dec. 30, 1930.  A. C. GONZALEZ  1,786,649
AIRPLANE LANDING DEVICE
Filed April 26, 1928   4 Sheets-Sheet 1
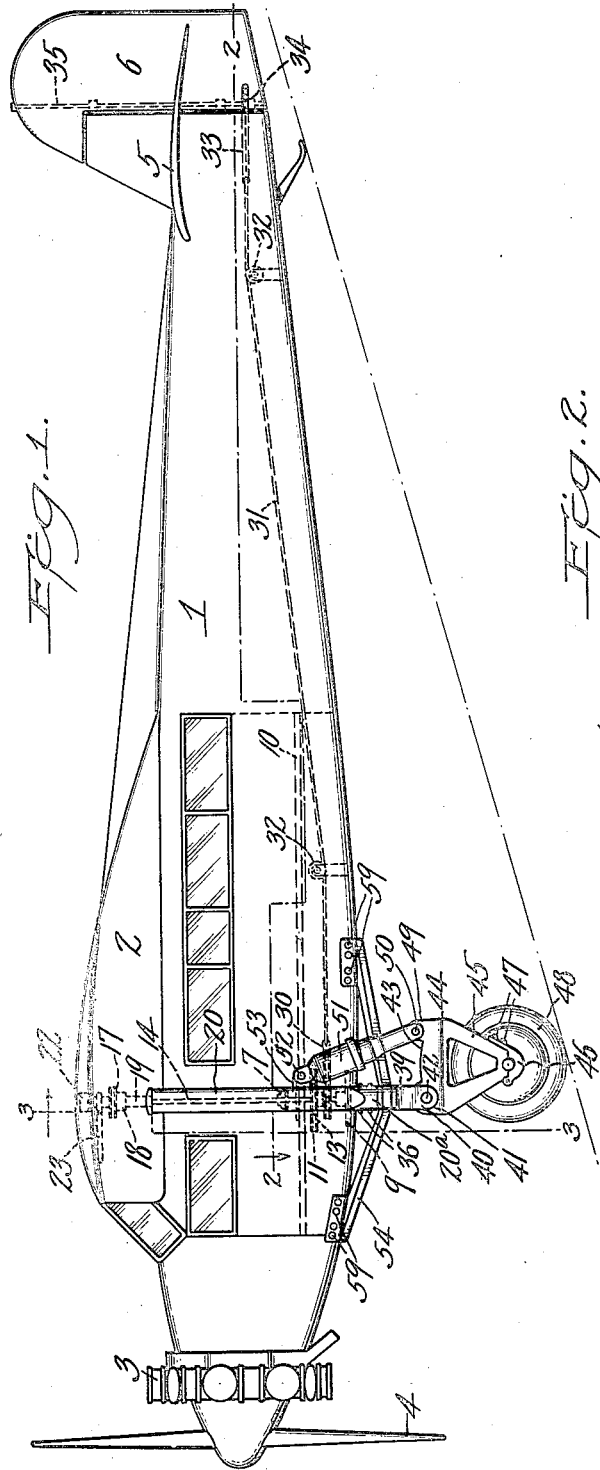
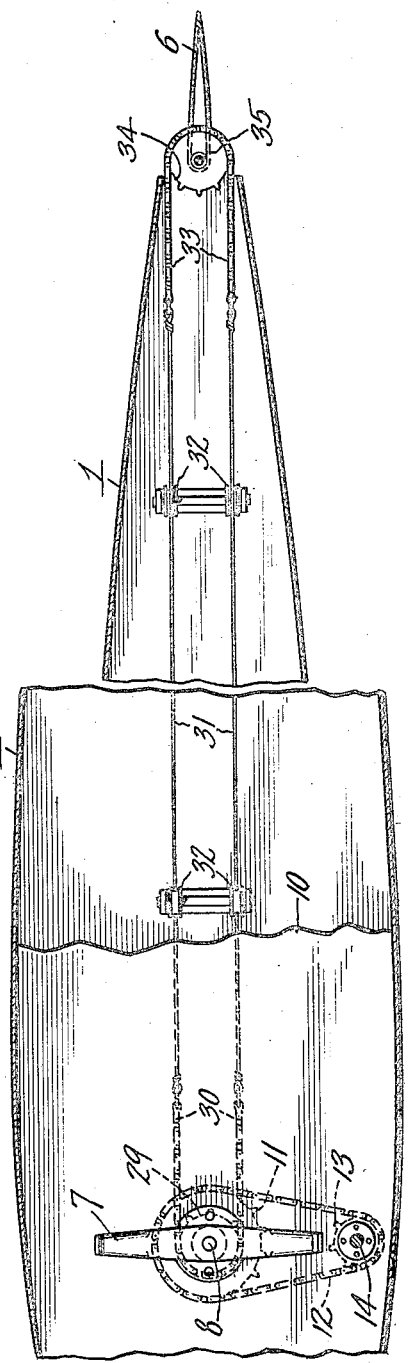
INVENTOR
Augusto C. Gonzalez

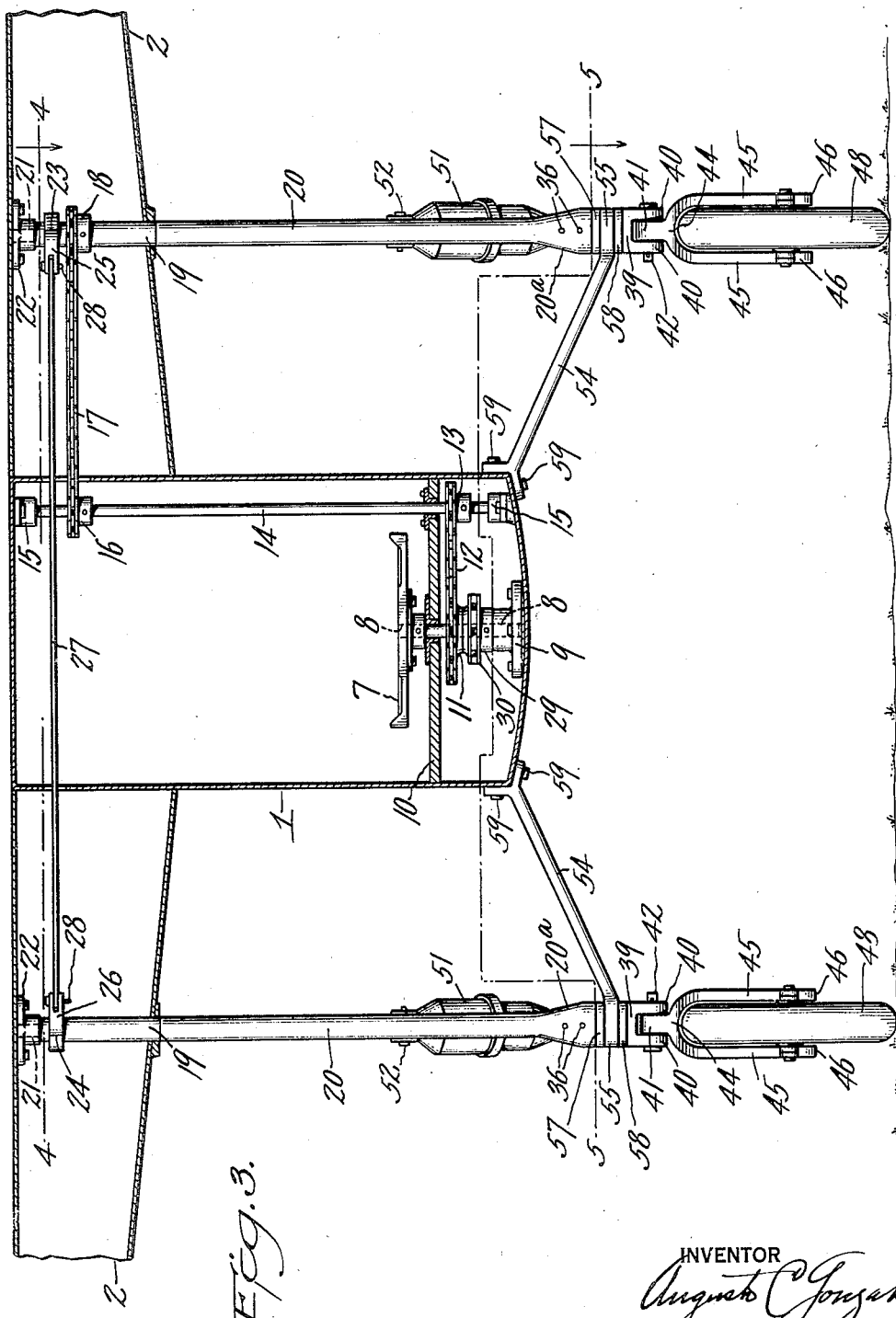

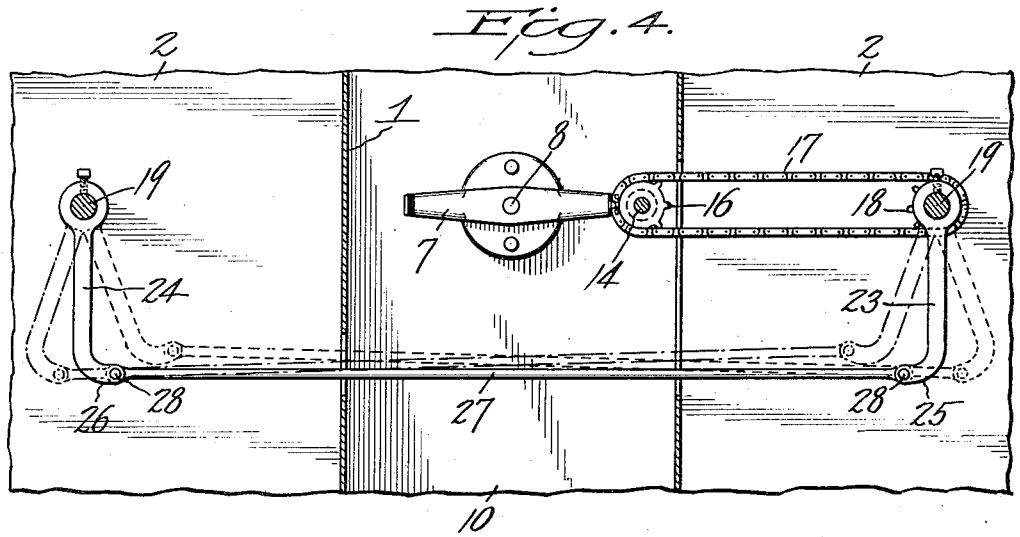
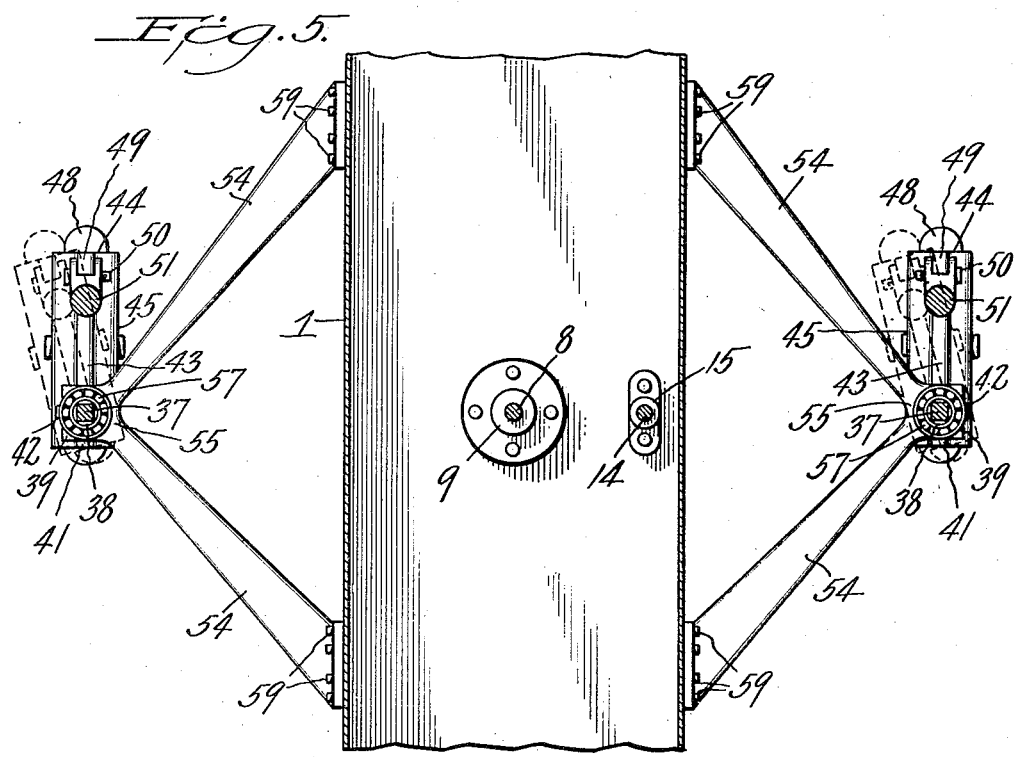

Dec. 30, 1930. A. C. GONZALEZ 1,786,649
AIRPLANE LANDING DEVICE
Filed April 26, 1928 4 Sheets-Sheet 4
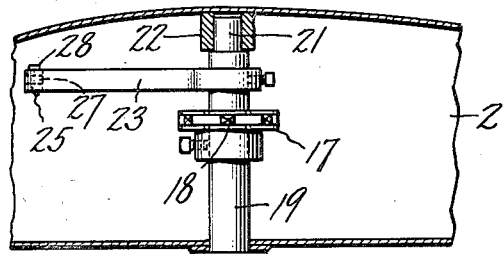
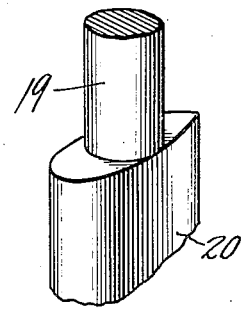
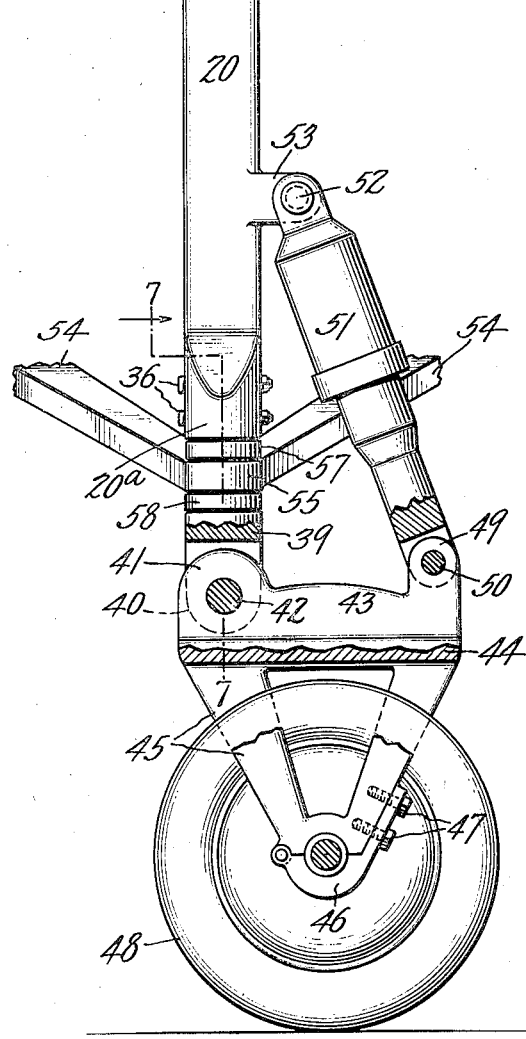
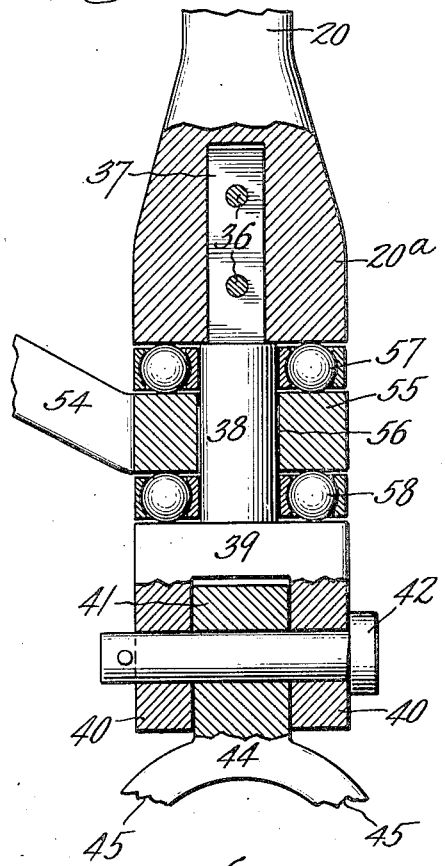
INVENTOR
Augusto C. Gonzalez Patented Dec. 30, 1930

1,786,649

UNITED STATES PATENT OFFICE

AUGUSTO C. GONZALEZ, OF RENO, NEVADA

AIRPLANE LANDING DEVICE

Application filed April 26, 1928. Serial No. 273,106.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention pertains to landing gears, specially adaptable to any form of flying machines, particularly to those that take off or land on ground or solid surfaces. The object of this device is to condition itself in accordance with the landing field or the direction of the wind, thereby preventing the wiping out of the landing gears and wheels, which would cause wreckage of the airplane, and possible injuries to the occupants, which, due to uncontrollable, rigid landing gears and wheels, is a frequent occurrence. Another object is to construct a device with movable and controllable landing wheels, operating in unison and in harmony with the rudder, and which can be operated from one position to another the same as the front wheels of an automobile, instead of only directly forward, as in the devices now in use.

Another object is to provide a landing gear which may be operated either automatically or under the control of a pilot, and in which the landing wheels and rudder may be shifted in any desired direction by the pilot before the direction of the body is changed.

A still further object is to construct a device of this character which may be used to take the airplane out of its hangar, or to easily steer it in, without the need of being manually pushed about.

With these and other objects in view, the invention consists of certain novel features including lightness and cheapness in construction, and increased efficiency of the rudder, that will be described in the specification and pointed out in the claims.

Metal, preferably duralumin, is the material used for construction. The device in its entirety is composed of relatively few parts, as hereinbefore stated. The scope of my invention extends to whatever constructions and interpretations may be defined by or included within the terms or language of the appended claims or the drawings.

Referring to the drawings:

Fig. 1 is a side elevation of a monoplane, showing my improved steering and landing gear as applied thereto.

Fig. 2 is an enlarged horizontal section through the fuselage, on the line 2—2 of Fig. 1, parts being broken away.

Fig. 3 is a vertical transverse section on the line 3—3 of Fig. 1.

Fig. 4 is a horizontal section showing how the main trusses are connected by a cross rod on the line 4—4 of Fig. 3, and show the same in different positions.

Fig. 5 is a horizontal section showing the landing gear braces, on the line 5—5 of Fig. 3 and showing the wheel frame in different positions.

Fig. 6 is an enlarged side elevation of one of the main trusses, parts being shown in section.

Fig. 7 is a further enlarged section of the lower end of one of the main trusses, showing how the parts are mounted, on the line 7—7 of Fig. 6, and Fig. 8 is a perspective view of a portion of one of the main trusses.

The following index fully explains the characters used in the drawings:

1. Fuselage of monoplane.
2. Ailerons.
3. Engine.
4. Propeller.
5. Elevators.
6. Rudder.
7. Rudder or foot bar.
8. Vertical shaft.
9. Bottom bearing.
10. Floor acting as upper bearing.
11. Sprocket wheel.
12. Sprocket chain.
13. Sprocket wheel.
14. Vertical shaft.
15. Upper and lower bearings.
16. Sprocket wheel.
17. Sprocket chain.
18. Sprocket wheel.
19. Reduced portion of 20.
20. Main truss.
20a. Enlarged rounded bottom portion.
21. Upper reduced end of shaft portion 19.
22. Upper bearings.
23. Left forwardly projecting arm.
24. Right forwardly projecting arm.
25. Curved inwardly projecting end of left arm.
26. Curved inwardly projecting end of right arm.
27. Connecting rod.
28. Connecting pins.
29. Sprocket.
30. Short sprocket chain (forward).
31. Connecting cables.
32. Guide pulleys.
33. Rear short sprocket chain.
34. Sprocket.
35. Rudder shaft.
36. Connecting bolts.
37. Squared upper end.
38. Vertical shaft portion.
39. Castor.
40. Forked portions.
41. Ear portion (forward).
42. Bolt (pivot).
43. Vertical web portion.
44. Wheel supporting frame.
45. Forked or side arms.
46. Hinged half bearings.
47. Bolts (pivot).
48. Landing wheel.
49. Rear ear portion.
50. Pivot bolt.
51. Shock absorber.
52. Pivot bolt.
53. Lug.
54. Landing gear frame.
55. Bearing portion of frame.
56. Central hole.
57. Upper ball bearing.
58. Lower ball bearing.
59. Securing landing gear frame to fuselage.

Heretofore all airplanes have been constructed with landing gears, the wheels being mounted in a rigid frame so that they move only in forward direction. My device is so constructed as to adapt airplane taxiing, taking off, and landing, to the surface condition of landing fields, and to the direction of the wind, thereby preventing the wiping out of the landing gear or wheels or both and wrecking the airplane and possibly causing injuries to the occupants.

These accidents are frequently caused by trying to make a landing on rough fields or in strong winds, or are due to general bad weather conditions and to the machine being mounted upon uncontrollable rigid type of landing gears and wheels, the same being movable only directly forward.

Airplane landing gear and wheels are such that the airplane cannot be turned without applying the brake to one wheel, raising the corresponding aileron, lowering the opposite aileron and applying left or right rudder as the case may be.

My device enables the wheels with harmonizing rudder and ailerons to be shifted or moved in the desired direction, precisely the same as the front wheels of an automobile before the direction of the body is changed.

My device has no wheel axle, each wheel being mounted and operating within two sets of bifurcated frames having an upper base, so that the whole frame constitutes a rigid triangle, which herein, and in the drawings, is called a wheel support. These wheel supports are also connected to the lower ends of main trusses, said main trusses extending through and being connected to the air foils or wings of the airplane.

The present form of my invention is shown, as applied to a monoplane of any desired form, in which the numeral 1 designates the fuselage, 2 the wings, 3 the motor, 4 the propeller, 5 the elevators, and 6 the rudder.

Referring now to Fig. 3, a foot control bar 7, which is operated by the feet of the pilot, is shown as being mounted upon the upper end of a short, vertical shaft, 8. This shaft is mounted in a lower bearing, 9, said bearing being fastened to the bottom of the fuselage and supported near its top by a bushing in the floor, 10.

A sprocket wheel 11, is fastened to the shaft, 8, and connected to a sprocket wheel, 13, which is keyed to a vertical shaft, 14, by means of a sprocket chain, 12.

The shaft 14, is shown as being supported in upper and lower bearings, 15, these bearings being fastened to the top and bottom of the fuselage.

Fastened near the top of the shaft, 14, is a sprocket 16, said sprocket being connected to a sprocket, 18, which is keyed to a reduced shaft, 19, through a sprocket chain, 17.

As clearly shown in Fig. 8, the shafts, 19, are a reduction of the main trusses, 20, and are also reduced at their upper ends as at 21. The upper end portions, 21, are shown as being mounted in bearings, 22, secured to the underside of the top of the wings, as most clearly shown in Fig. 6.

Between the sprocket, 18, and the bearing, 22, is mounted an arm, 23, on the reduced shaft, 19, of the left truss, and a corresponding arm, 24, is mounted on the other reduced shaft, 19, which is a reduction of the truss on the right side of the fuselage. These arms, 23 and 24, each have inwardly curved ends, 25 and 26, which are connected by means of a cross rod, 27. The cross rod, 27, is connected to each curved portion, 25 and 26, by pins, 28, as clearly shown in Figs. 3 and 4.

It will be seen by this construction that the pilot can through the foot bar, 7, control and operate at will the landing gear and wheels upon both sides so that they may synchronize, and function in unison with the rudder and ailerons in the event of a landing, the wheels automatically turning in the proper direction, thus avoiding possible wreck or injury to machine or occupants. Referring to Figs. 2 and 3, a sprocket 29 is shown as keyed to shaft 8, said sprocket is connected to sprocket 34, keyed to the rudder shaft 35, through sprocket chains 30 and 33 and said chains are connected together by cables 31. These cables 31 pass under and over guide pulleys 32 which are mounted in brackets fastened to the bottom of the fuselage, as best shown in Figs. 1 and 2.

It is obvious from this construction how the rudder and landing wheels will work in perfect unison.

Referring now to Figs. 3, 6 and 7, the lower end of the main trusses 20 are enlarged or rounded at 20a, and are provided with square holes to receive the squared portions 37 of the castors 39. The main trusses and the squared portions 37 are connected by bolts 36.

Intermediate of the squared portions 37 and the main portion 39 of each castor is an integral rounded shaft portion 38 the purpose of which will be hereinafter described.

The castors 39 are provided with ears 40 which are adapted to receive an ear 41 of the wheel supporting frames 44 and are connected therewith by pins 42.

As best shown in Fig. 6, the wheel supporting frames 44 have integral side arms 45 between which are supported landing wheels 48. These side arms at their bottoms are provided with half hinged bearing members 46, which are fastened in their closed position by means of screw bolts 47.

By this construction it will be seen that the wheels can be easily and quickly removed and replaced in case of repairs.

At 43 in Figs. 5 and 6 are shown connecting webs, connecting the forward ears 41 and the rearward ears 49.

The rearward ears 49 each have connected therewith the lower end of a shock absorber 51 through a bolt 50 and the said shock absorber is connected at its upper end by a bolt 52 to a lug 53 which is integral with the truss 20, thereby taking up impact and rebound at all speeds while the airplane is on the ground.

Referring to Figs. 3 and 5, the landing gear frames 54 are shown in the form of V-shaped frames, but any shape frames may be used, depending upon the size and shape of the machine to which they are to be applied.

The landing gear frames 54 are each provided with a central bearing portion 55, having a central hole, 56. The central hole is for the reception of the vertical shaft portion 38 before referred to and said vertical shaft portion forms a bearing for the lower end of the main truss 20.

Placed above and below the central bearing portions 55 of each landing gear frame 54 are ball bearings 57 and 58. The upper ball bearing 57 separates the lower enlarged bearing surface of the end 20a of the trusses, and the upper bearing surface of the central bearing portion 55. The lower ball bearings 58, separate the underneath bearing surface of the central bearing portion 55 from the upper bearing surface of the castor 39. It will be seen from this construction that the trusses and all of the parts connected therewith can be very easily operated by the pilot through the foot rod 7 or automatically.

The landing gear frames are fastened to the fuselage by means of bolts or screws 59.

What I claim is:

1. A device of the kind described, comprising two landing gear frames, said landing gear frames being connected to a fuselage, each frame being formed with a bearing portion, said bearing portion supporting the lower end of a revolvable truss, and said revolvable truss having pivotly mounted thereon, yieldable wheel supporting frames revolving therewith.

2. A device of the kind described, comprising two landing gear frames, said landing gear frames being connected to a fuselage, each frame being formed with a bearing portion, said bearing portion supporting the lower end of a revolvable truss, and each revolvable truss being pivoted at its upper end, having fastened thereto, forwardly projecting arms, the end of said projecting arms being curved inwardly and being connected together to cause each of said revolvable trusses to operate alike.

3. A device of the kind described, comprising two landing gear frames, said landing gear frames being connected to a fuselage, each frame being formed with bearing portions, said bearing portions supporting the lower ends of revolvable trusses, said revolvable trusses being pivoted at their upper ends, and one of said trusses having means connected thereto to cause said truss to be operated through mechanism from the pilot.

4. A device of the kind described, comprising two landing gear frames, said landing gear frames being connected to a fuselage, a rudder being mounted on the rear thereof, said rudder having means fastened thereon to cause said rudder to be operated with the wheel supporting frames, said wheel supporting frames being connected to the lower ends of revolvable trusses and operated through mechanism by the pilot to cause said rudder and said wheel supporting frames to operate in unison.

5. In a machine of the character designated, the combination with a fuselage including a vertically journalled rudder shaft, a landing gear connected with the fuselage, said gear comprising a pair of parallelly arranged vertically mounted rotatable trusses, a wheel frame pivotally connected to the lower end of each truss and shock absorbing means interposed between each frame and truss; of means to effect simultaneous rotation of the rudder shaft and the trusses, said means comprising an arm affixed to each truss adjacent its upper end, a link connection between the arms, a foot operating mechanism within the fuselage and connections between said mechanism, the rudder shaft and said trusses.

6. A device of the character described comprising a fuselage, a landing gear frame connected with the fuselage and formed with a bearing support, a truss rotatably journalled at its upper end in the fuselage, a wheel supporting frame and an anti-friction castor type of connection between the lower end of the truss and the wheel supporting frame, the connection being through the bearing support.

7. A device of the character described comprising a fuselage, a landing gear frame connected with the fuselage and being formed with a bearing support, a truss rotatably journalled at its upper end in the fuselage, a castor, a connection between the castor and the lower end of the truss, said connection being through the bearing support and including anti-friction devices, a wheel-supporting frame pivotally connected at its forward portion to the castor and a shock absorbing device interconnecting the rear portion of the wheel-supporting frame with said truss.

8. In a device of the character described the combination with a fuselage, a pair of landing gear frames connected with the fuselage, each of said frames being formed with a bearing support, a pair of trusses rotatably journalled at their upper ends in the fuselage, wheel supporting frames, anti-friction castor type connections between the forward portions of the wheel supporting frames and the lower extremities of the trusses, said connections being through the bearing supports, and a shock absorbing means interposed between the rear portion of each wheel supporting frame and truss; of means to effect simultaneous rotation of the rudder shaft and the trusses, said means comprising an arm affixed to each truss adjacent its upper end, a link connection between the arms, a foot operated mechanism within the fuselage and connections between said mechanism, the rudder shaft and said trusses.

9. A machine of the character designated, the combination with a fuselage including a vertically journalled rudder shaft, a landing gear frame connected with the fuselage, said gear comprising a pair of parallelly arranged rotatably mounted trusses, a wheel frame pivotally connected to the lower end of each truss, shock absorbing means interposed between each frame and truss; of means to effect simultaneous rotation of the rudder shaft and the trusses, said means comprising an arm affixed to each truss and adjacent its upper end, a link connection between the arms, a foot operated mechanism within the fuselage and connections between said mechanism, the rudder shaft and said trusses.

10. A device of the character described comprising a fuselage, a landing gear frame connected with the fuselage and being formed with a bearing support, a truss rotatably journalled at its upper end in the fuselage, a castor, a connection between the castor and the lower end of the truss, said connection being through the bearing support and including an anti-friction device, a wheel-supporting frame pivotally connected at its forward portion to the castor and a yieldable connection between the rear portion of the wheel-supporting frame and said truss.

AUGUSTO C. GONZALEZ.